United States Patent
Remer et al.

(10) Patent No.: US 6,598,083 B1
(45) Date of Patent: Jul. 22, 2003

(54) SYSTEM AND METHOD FOR COMMUNICATING OVER A NON-CONTINUOUS CONNECTION WITH A DEVICE ON A NETWORK

(75) Inventors: Eric B. Remer, American Fork, UT (US); David A. King, Highland, UT (US); David L. Remer, Orem, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,082

(22) Filed: Dec. 30, 1999

(51) Int. Cl.[7] .................. G06F 15/16; G06F 15/173
(52) U.S. Cl. .................. 709/229; 713/201; 709/225
(58) Field of Search .................. 370/401, 239; 709/229, 222, 250, 201; 705/79, 39, 34, 77; 713/201

(56) References Cited

U.S. PATENT DOCUMENTS

| | | | | |
|---|---|---|---|---|
| 5,774,660 A | * | 6/1998 | Brendel et al. | 709/100 |
| 5,838,682 A | * | 11/1998 | Dekelbaum et al. | 370/401 |
| 5,950,172 A | * | 9/1999 | Klingman | 705/26 |
| 5,960,177 A | * | 9/1999 | Tanno | 709/229 |
| 5,987,132 A | * | 11/1999 | Rowney | 705/26 |
| 5,996,076 A | * | 11/1999 | Rowney et al. | 705/76 |
| 6,002,767 A | * | 12/1999 | Kramer | 705/26 |
| 6,012,100 A | * | 1/2000 | Frailong et al. | 709/220 |
| 6,073,172 A | * | 6/2000 | Frailong et al. | 709/222 |
| 6,098,108 A | * | 8/2000 | Sridhar et al. | 709/239 |
| 6,308,213 B1 | * | 10/2001 | Valencia | 709/229 |
| 6,477,578 B1 | * | 11/2002 | Mhoon | 709/229 |
| 6,477,579 B1 | * | 11/2002 | Kunkel et al. | 709/229 |
| 6,510,523 B1 | * | 1/2003 | Perlman et al. | 713/201 |

OTHER PUBLICATIONS

Hypertext Transfer Protocol —HTTP/1.1, www.ietf.org//rfc/rfc2616.txt, R. Fielding et al.; The Internet Society, Jun. 1999, pp. 1–155.

Enabling Secure Virtual Private Networks Over the Internet, white paper No. NP0894.01, Intel Corp., Santa Clara, CA (1998) pp. 1–11.

Classical versus transparent IP proxies, RFC1919, M. Chatel, Network Working Group, Mar. 1996, www.ietf.org//rfc/rfc1919.txt, pp. 1–34.

* cited by examiner

Primary Examiner—David Wiley
Assistant Examiner—M. Delgado
(74) Attorney, Agent, or Firm—Pillsbury Winthrop LLP

(57) ABSTRACT

A novel system and method for communicating over a non-continuous connection with an entity on a local area network (LAN) reduces the costs and risks associated with maintaining a continuous connection between the LAN and an external network, such as the Internet. The invention may use a trusted arbitrator as an intermediary between the LAN and external entities seeking to communicate with an entity within the LAN. Requests from external entities are routed to the trusted arbitrator, which contacts a connection entity within the LAN. The connection entity authenticates the contact and causes a connection to be established to the external network and thereby with the trusted arbitrator.

22 Claims, 10 Drawing Sheets

PRIOR ART

PRIOR ART

SYSTEM AND METHOD FOR COMMUNICATING OVER A NON-CONTINUOUS CONNECTION WITH A DEVICE ON A NETWORK

BACKGROUND OF THE INVENTION

1. Field of the Invention

The present invention is directed to communicating with a device on a network. More specifically, the present invention is directed to communicating over a non-continuous connection with a device on a network.

2. Description of Related Art and General Background

A network is a system of computers that are connected to each other (and possibly to terminals and other peripheral devices) by communications lines which may be physical and/or wireless. Each computer on a network may be generally classified as a 'client' (i.e. a computer that initiates requests) or a 'server' (i.e. a computer that receives and responds to requests), although a single computer may also perform different roles at different times. Transfers of information across the network are typically conducted in compliance with one or more network protocols to ensure that the information may be properly delivered and interpreted. One such protocol is the Hypertext Transfer Protocol or HTTP, an application-level protocol that provides a basis for information transfer across the Internet and is specified e.g. in RFC 2616 ("Hypertext Transfer Protocol—HTTP/1.1"), R. Fielding et al., June 1999, which document is available at http:/Hwww.ietf.org/rfc/rfc2616.txt. As shown in FIG. 1, HTTP is a query/response protocol in which an entity such as a client 30 directs a query for information to a specific resource (such as a file or web page, as identified by a Universal Resource Locator or URL) and another entity such as a server 40 forwards an appropriate response associated with that resource.

A local area network (or 'LAN') allows computers or terminals that are located near one another to share resources such as storage devices, printers, and other peripheral equipment. A LAN that is connected to a larger network may include one or more access points (or 'gateways') through which devices within the LAN may communicate with devices outside the LAN. Access control mechanisms (or 'ACMs') provide security against unauthorized access to the LAN by controlling or restricting the flow of information across the access points. FIG. 2, for example, shows a LAN 230 that is connected to the Internet 250 only through an ACM 20a. Due to the presence of ACM 20a at this access point, a remote computer 20c that is connected to the Internet 250 may not freely interact with devices connected to LAN 230 such as computer 10a. Any request for information that is sent by remote computer 20c to computer 10a will be scrutinized by ACM 20a and may be rejected.

One type of ACM is a firewall. The term 'firewall' indicates a protective layer that separates a computer network from external network traffic, and this layer may be implemented in software, hardware, or any combination of the two. For example, firewall application software may be installed on a server to create a combination called a 'firewall server.' Another type of ACM is a server (possibly a firewall server) running an application program that evaluates incoming requests according to a predefined set of rules (also called 'packet filtering'). Such a device is called a 'proxy server' or simply a 'proxy.' To entities outside the network, the proxy may act as a server, receiving and evaluating incoming transmissions. To devices within the network, the proxy may act as a client, forwarding the incoming transmissions which conform to its rules. For example, the proxy may prevent executable files from entering the LAN but may pass all incoming responses to HTTP queries that were sent by devices within the LAN.

Unfortunately, the characteristics that make firewalls or proxies effective in controlling the flow of information into the network also lead to increased complexity and cost. For example, when an entity outside the LAN, such as remote computer 20c, seeks to be connected with an entity within the LAN, such as computer 10a, complex and/or costly changes to the ACM may be necessary to permit the connection. In addition, significant processing resources are consumed in evaluating all gateway traffic to ensure compliance with the network's security rules and thereby protect the network from potentially harmful traffic. Furthermore, it may be impractical and/or expensive to maintain a continuous connection between the LAN and the external network (e.g. the Internet).

Some solutions to these problems of overhead—such as setting aside a dedicated, open port in the firewall through which external traffic may enter—may create unacceptable security risks. Other, more secure solutions include virtual private networks (VPNs), which use encryption to allow users on different networks to exchange information with each other in a secure manner over the Internet. This encryption effectively creates a secure "tunnel" between sender and receiver so that even though the information may pass through many other entities during transmission, it is accessible only to the sender and the receiver.

Although a VPN offers a higher level of data security, no reduction in overhead processing is thereby achieved, as network traffic entering the LAN through the VPN must still pass through and be evaluated by the ACM. Adding a VPN to an existing network also involves a significant investment in resources and may introduce bugs or errors into a stable system. Furthermore, in many network installations it may not be feasible to reconfigure an existing ACM to support communication with every new external entity that may be desired, as such modifications require extensive resources and testing. It is desirable to reduce or avoid these costs and risks.

DETAILED DESCRIPTION

Figure 1:
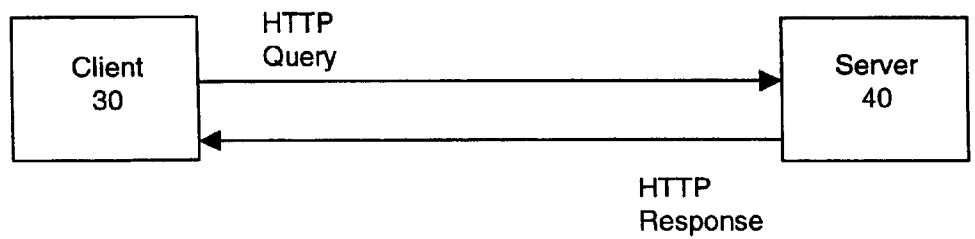
FIG. 1 illustrates the flow of data in a HTTP query and response.
Figure 2:
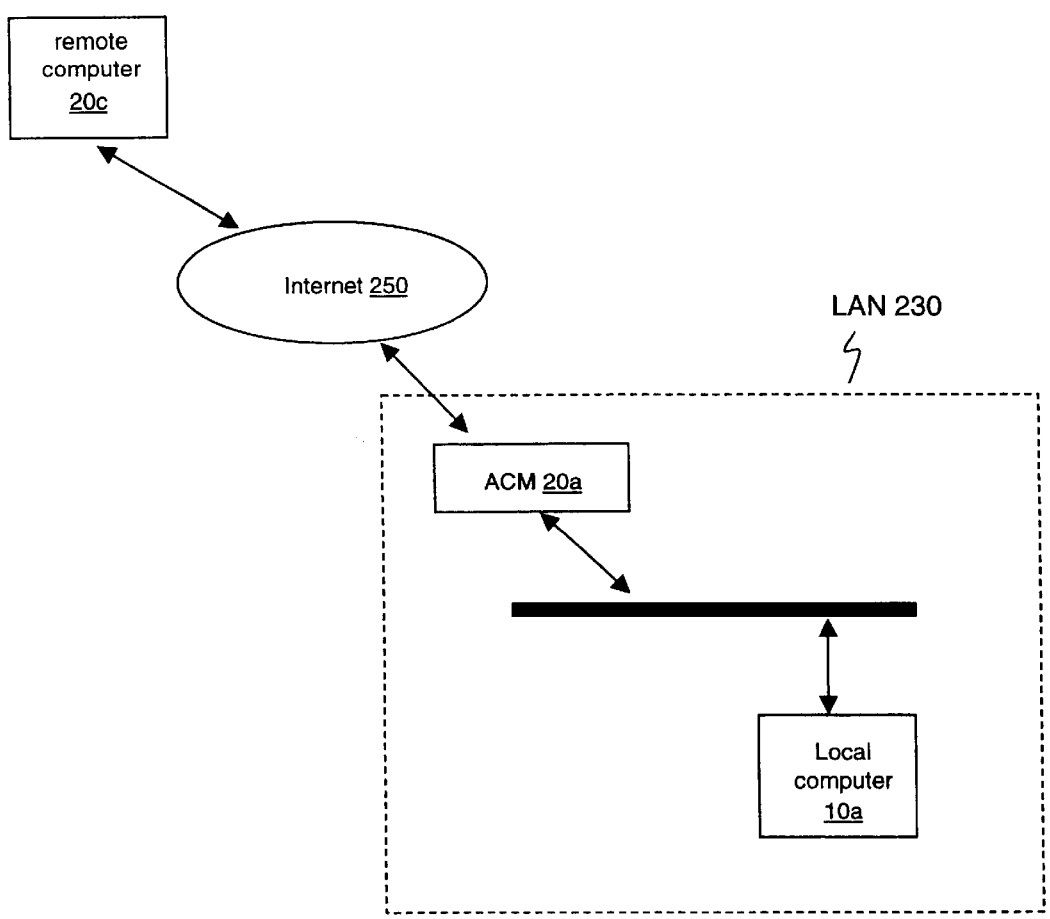
FIG. 2 shows a block diagram of a system including a local area network and a remote computer.
Figure 3:
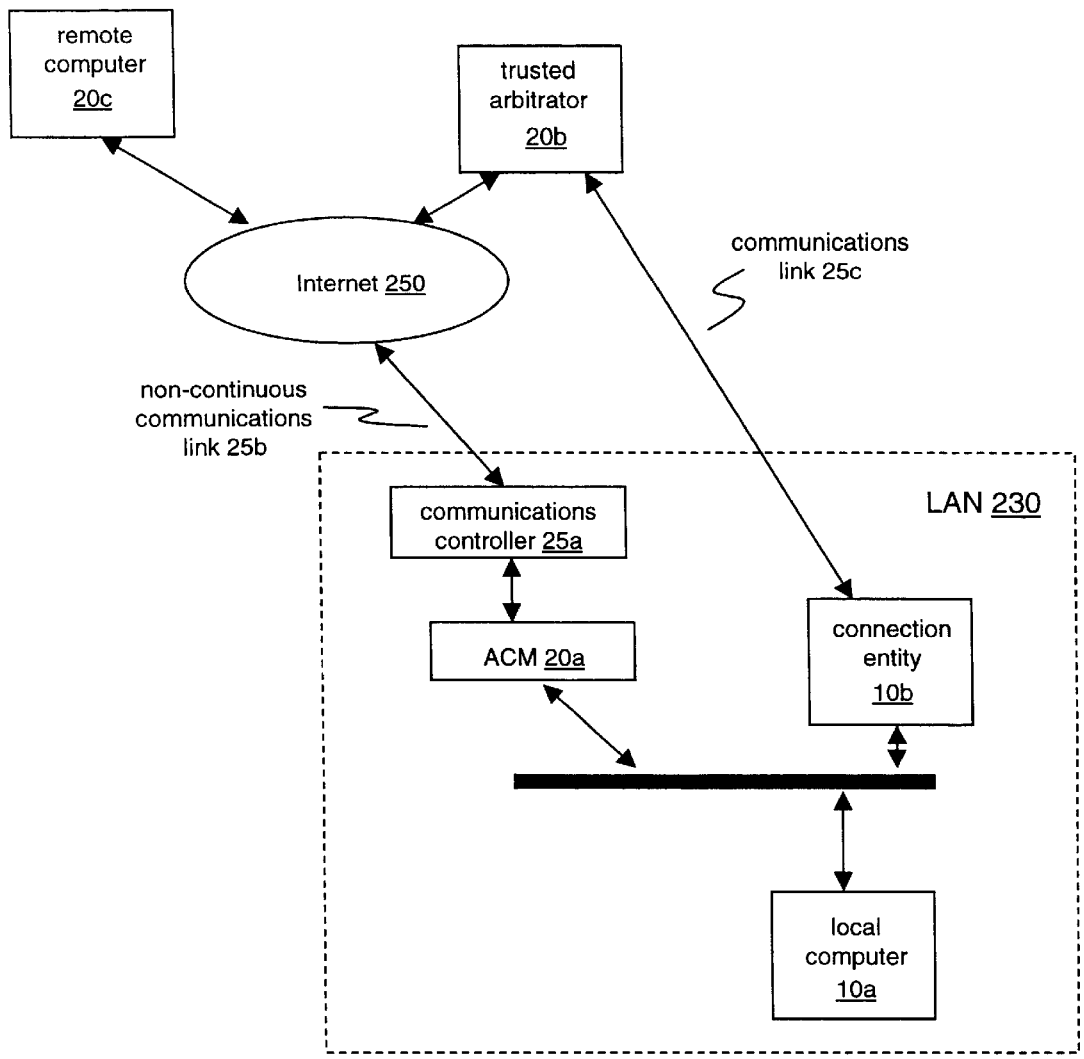
FIG. 3 shows a block diagram of a system according to an embodiment of the invention.

FIG. 3 shows an overall perspective view of a first embodiment of the invention. A remote computer 20c is connected to a network such as the Internet 250. A LAN 230 comprises various components including a local computer 10a and a connection entity 10b (discussed below). Other components such as additional computers, printers, and file servers may also be connected to LAN 230.

LAN 230 is connected to an external network (here, the Internet 250) through ACM 20a, which protects components within LAN 230 from external network traffic by intercepting communication requests that are sent directly to these components from entities outside the network. The communications link 25b between LAN 230 and the external network is not continuously operational, however. Rather, this link is maintained by communications controller 25a, which brings up link 25b on an as-needed basis as instructed by, e.g., ACM 20a and then releases it. In one implementation, communications controller 25a is a dial-up router and link 25b is supported via modem over a telephone line. Communications controller 25a may be configured in various different ways: for example, it may maintain link 25b until explicitly instructed to close it, or it may maintain link 25b only for a specified period of time, or it may maintain link 25b only until a predetermined timeout period has passed since the most recent information transfer between LAN 230 and the external network.

A trusted arbitrator 20b is also connected to the Internet 250. Subject to the restrictions dictated by ACM 20a (and the status of link 25b as controlled by communications controller 25a), information may thereby flow among entities connected to LAN 230, remote computer 20c, and trusted arbitrator 20b. (The term 'entity' as used herein refers to any device or process that originates or terminates a request for information. For example, an entity may be a computer, an application program, or an embedded processor.)

One of the entities connected to LAN 230 is a connection entity 10b, which interacts with trusted arbitrator 20b regarding communication requests sent by external entities (such as remote computer 20c) to devices within LAN 230. Connection entity 10b may reside on a device such as a router, on a dedicated computer, or on a computer that performs other tasks as well (for example, ACM 20a and connection entity 10b may reside on the same entity). Regardless of the form of connection entity 10b, trusted arbitrator 20b communicates with connection entity 10b to transmit requests from one or more external entities (such as remote computer 20c), such requests being directed to one or more entities within LAN 230 (such as local computer 10a).

In addition to the communications pathway which includes communications link 25b, another communications pathway exists between trusted arbitrator 20b and connection entity 10b which includes communications link 25c. Upon receiving a request from an external entity that is directed to an entity within LAN 230, trusted arbitrator 20b contacts connection entity 10b over communications link 25c. In one implementation, communications link 25c includes a telephone line, and trusted arbitrator 20b initiates the contact with connection entity 10b by making a telephone call to a modem (not shown) that communicates with connection entity 10b or may be a part of connection entity 10b. Connection entity 10b then terminates the contact over communications link 25c and begins to communicate with trusted arbitrator 20b via communications link 25b. (In some implementations, communications link 25b and communications link 25c may share the same telephone line.) Upon retrieving a request from trusted arbitrator 20b that is directed toward an entity within LAN 230, connection entity 10b forwards the request to the appropriate entity via LAN 230.

In this embodiment of the invention, remote computer 20c sends communication requests for local computer 10a to trusted arbitrator 20b over the Internet 250, rather than directly to local computer 10a through ACM 20a. Remote computer 20c sends these requests (e.g. in response to a user's keyboard or mouse requests, or as directed by an application program, or in response to a request by a client within a LAN that includes remote computer 20c) to trusted arbitrator 20b through the arbitrator's website, which is accessed by using its Universal Resource Locator (URL). Connection entity 10b may also exchange information with trusted arbitrator 20b through this or another URL associated with trusted arbitrator 20b.

Before remote computer 20c is permitted to communicate with an entity within LAN 230, trusted arbitrator 20b performs a certification process in order to establish the validity of the request sent by remote computer 20c. In one implementation, trusted arbitrator 20b certifies the request by verifying the identity of remote computer 20c. By virtue of such a certification process, an impostor may not assume the identity of remote computer 20c without running afoul of trusted arbitrator 20b. In another implementation, trusted arbitrator 20b assigns an authentication identity to remote computer 20c upon certification. In a further implementation, trusted arbitrator 20b certifies the request by verifying that remote computer 20c is capable of transmitting and receiving information in a secure manner.

Thus, in order to request communication with an entity within LAN 230 such as local computer 10a, remote computer 20c transmits a request through a network such as the Internet 250 to trusted arbitrator 20b. In one implementation, remote computer 20c makes this request by contacting trusted arbitrator 20b through its website and thereby supplying the trusted arbitrator with information about the request: for example, the identity or location of LAN 230, the nature of the request, and the particular entity within the LAN to which the request is directed.

Upon receiving a request from remote computer 20c that is directed toward an entity within LAN 230, trusted arbitrator 20b contacts connection entity 10b over communications link 25c. Before or during this contact, a basis for identification of trusted arbitrator 20b by connection entity 10b (or, alternatively, a basis for identification of connection entity 10b by trusted arbitrator 20b) may also be established. For example, connection entity 10b may authenticate this contact via a predetermined secret that is shared by connection entity 10b and trusted arbitrator 20b. Connection entity 10b may establish the basis for identification by selecting trusted arbitrator 20b as its intermediary for all requests directed to entities within LAN 230. In one embodiment, connection entity 10b connects to trusted arbitrator 20b through the trusted arbitrator's website, exchanging information with trusted arbitrator 20b that will allow the two entities to continue to communicate with each other in the future. For example, trusted arbitrator 20b may provide connection entity 10b with an authentication identity that connection entity 10b can use in future communication with trusted arbitrator 20b.

It is possible that trusted arbitrator 20b may service several different LANs and/or several different remote entities. In such case, trusted arbitrator 20b may also forward a URL to connection entity 10b over communications link 25c, wherein the URL identifies the location to which connection entity 10b may direct its communications with trusted arbitrator 20b over communications link 25b. This feature reduces the need for trusted arbitrator 20b to dedicate fixed resources such as a particular URL to remote computer 20c or to LAN 230 and allows trusted arbitrator 20b to dynamically reconfigure its communications interface.

Figure 4:
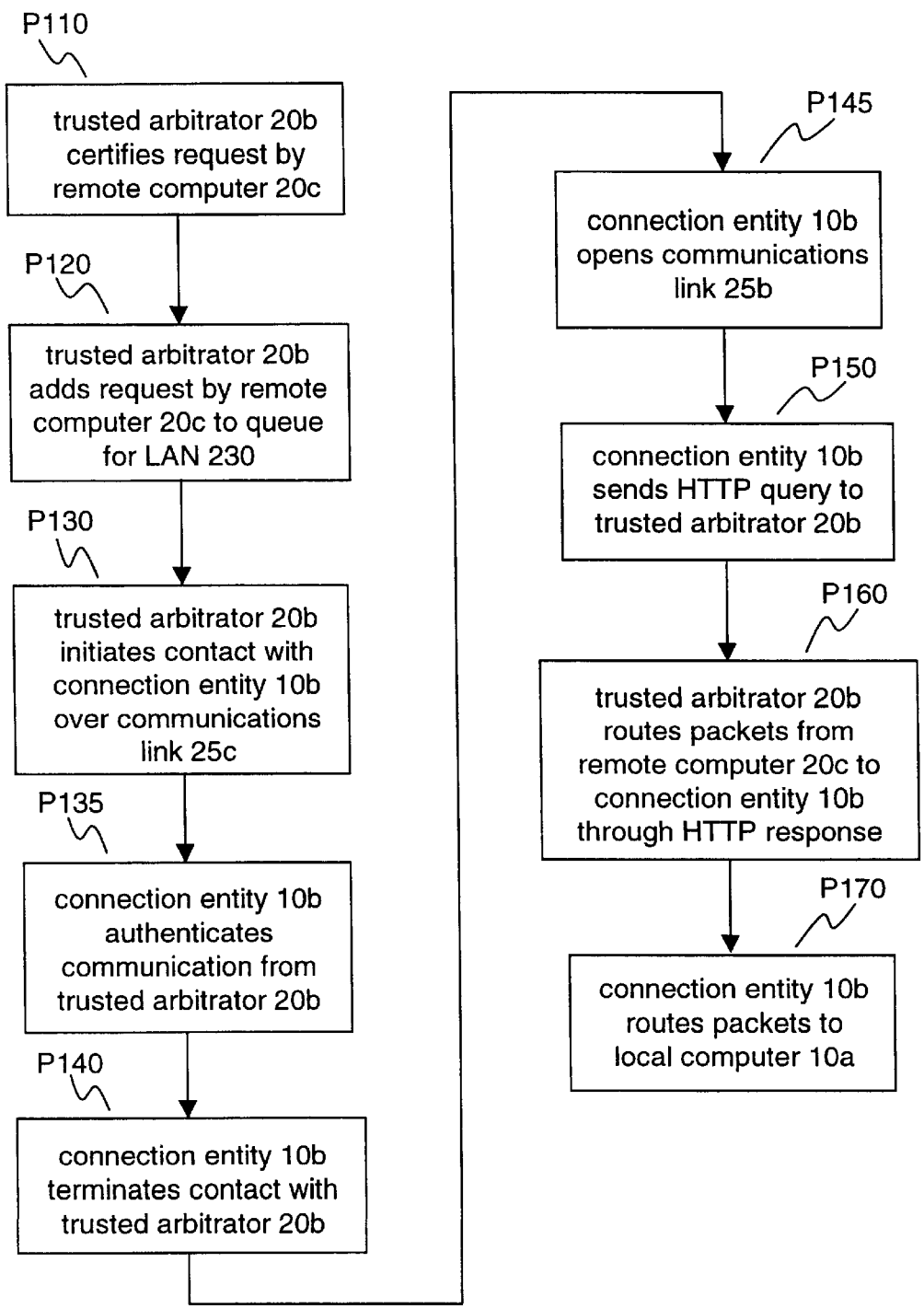
FIG. 4 shows a flow chart for a method according to an embodiment of the invention.

FIG. 4 illustrates a method according to an embodiment of the invention. In block P110, upon receiving a request from remote computer 20c, trusted arbitrator 20b certifies the request by, for example, verifying the identity of remote computer 20c. In one implementation, trusted arbitrator 20b certifies the request by verifying identification information which remote computer 20c forwards along with the request. If the certification is successful, then trusted arbitrator 20b processes the request; otherwise, trusted arbitrator 20b rejects the request.

If trusted arbitrator 20b determines that it has received a valid request from remote computer 20c, then in block P120 trusted arbitrator 20b organizes the request for forwarding to connection entity 10b. In one implementation, trusted arbitrator 20b adds the request to a queue in a secure area within its website that may be designated for connection entity 10b (i.e. for LAN 230). The organization of this secure area may be dynamically reconfigurable to promote the efficient processing of requests originating from multiple remote entities and/or directed to multiple LANs.

In block P130, trusted arbitrator 20b initiates contact with connection entity 10b over communications link 25c. In one implementation, this task is performed by making a telephone call to a modem that communicates with connection entity 10b. In block P135, connection entity 10b authenticates the communication received from trusted arbitrator 20b over communications link 25c. For example, connection entity 10b may authenticate the communication on the basis of a shared secret known to connection entity 10b and trusted arbitrator 20b (e.g. information based on a preassigned or predetermined identity). As noted above, some implementations may support an additional exchange of information between trusted arbitrator 20b and connection entity 10b during this communication, such as the identification of a URL through which further communication with trusted arbitrator 20b may be conducted over the Internet.

Upon authentication (and the completion of any further exchange of information as appropriate), connection entity 10b terminates the contact with trusted arbitrator 20b over communications link 25c (block P140) and opens communications link 25b (block P145). In the system of FIG. 3, for example, connection entity 10b (whether directly or indirectly via, e.g., ACM 20a) causes communications controller 25a to establish an active communications link to the external network. Communications controller 25a may establish this link by, for example, making a telephone call to a server (not shown) that is maintained by an Internet service provider (ISP).

In block P150, connection entity 10b opens a HTTP pipe by sending a HTTP query to trusted arbitrator 20b. Trusted arbitrator 20b then forwards the request or requests residing in the corresponding queue to connection entity 10b in the form of packets attached to the HTTP response to that query (block P160). Because this HTTP response is associated with a HTTP query that connection entity 10b initiated, it passes through ACM 20a without being evaluated. In addition, because the HTTP response originated from an entity that is trusted by connection entity 10b, connection entity 10b is assured that the HTTP response is secure. As indicated in block P170, connection entity 10b routes the information within the HTTP response to the appropriate entity within LAN 230 (e.g. as indicated within the response). If the response indicates that the information relates to records that are located on a storage medium of local computer 10a, for example, connection entity 10b routes the information to local computer 10a for processing.

In one exemplary use, remote computer 20c may wish to send a HTTP query to local computer 10a. Because remote computer 20c is not known to ACM 20a, a query sent by remote computer 20a directly to local computer 10a will not reach its destination. If the query is sent by trusted arbitrator 20b as a payload to a HTTP query as described above, however, then it will be admitted by ACM 20a and forwarded to local computer 20a as desired by connection entity 10b. Thus the overhead of configuring the system to allow direct secure communication with remote computer 20c is avoided without compromising the security of LAN 230.

In a modification of a system and method as described above, connection entity 10b detects whether a communications link 25b is active. If link 25b is not active, then connection entity 10b waits to receive a contact from trusted arbitrator 20b over communications link 25c (e.g. as shown in block P135 of FIG. 4). If link 25b is active, however, connection entity 10b uses it to poll trusted arbitrator 20b at regular intervals to determine whether any requests directed toward entities within LAN 230 may be ready for forwarding. In such an implementation, trusted arbitrator 20b may delay initiating the contact over communications link 25c for a period on the order of the expected interval between polling inquiries. If a response from trusted arbitrator 20b via communications link 25b indicates that requests are ready for forwarding to connection entity 10b, then connection entity 10b opens a HTTP pipe to trusted arbitrator 20b (e.g. as shown in block P150 of FIG. 4). In a further modification, a polling inquiry itself may open a HTTP pipe through which the requests may be forwarded by trusted arbitrator 20b.

Figure 5:
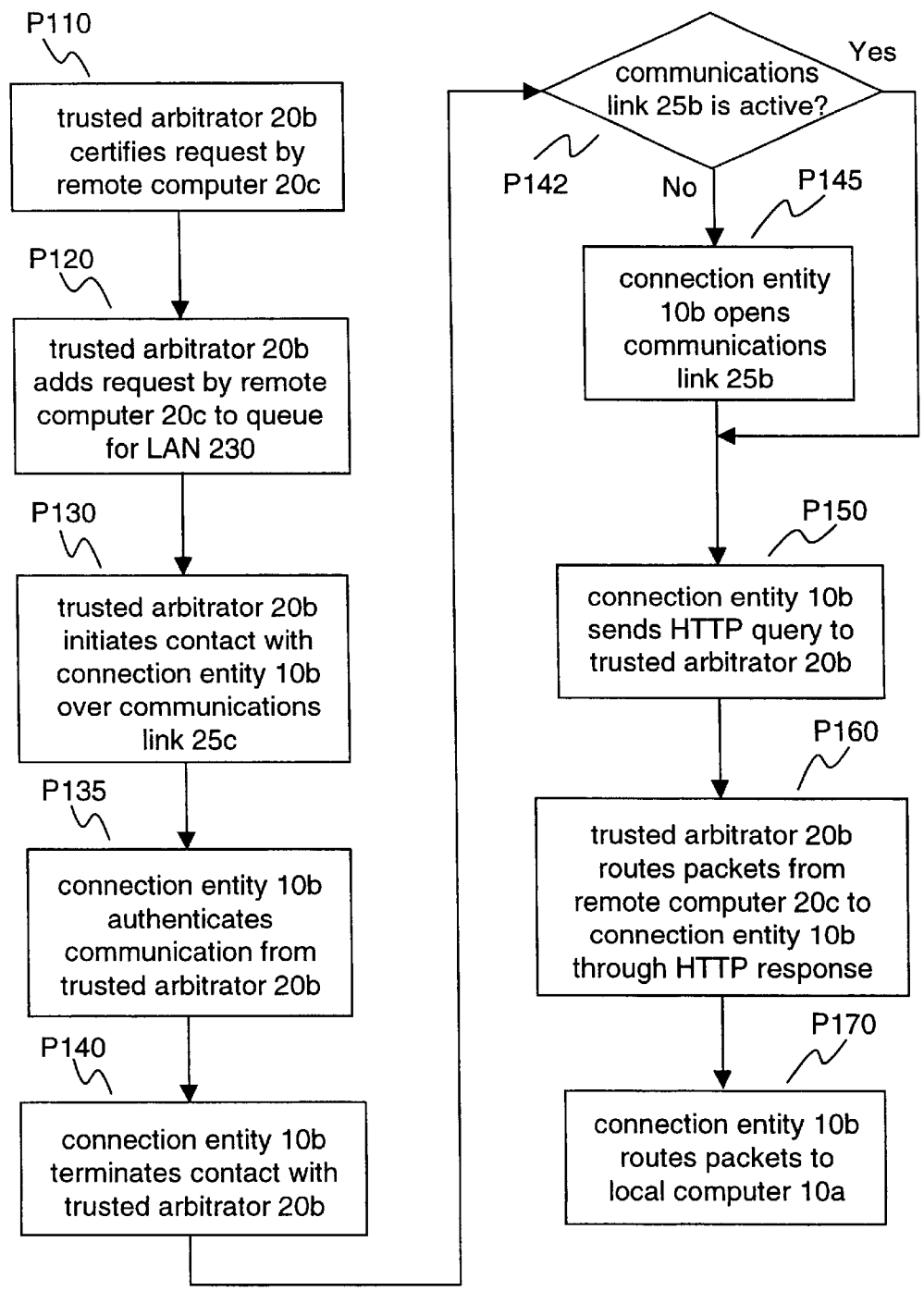
FIG. 5 shows a flow chart for a modified method according to an embodiment of the invention.

FIG. 5 shows a method according to a further embodiment of the invention wherein connection entity 10b detects whether communications link 25b is already active (block P142). In this implementation, for example, connection entity 10b shares the same communication line as ACM 20a, and it is possible that communications link 25b has already been established for another purpose. If no link is detected, connection entity 10b opens communications link 25b as described above.

Figure 6:
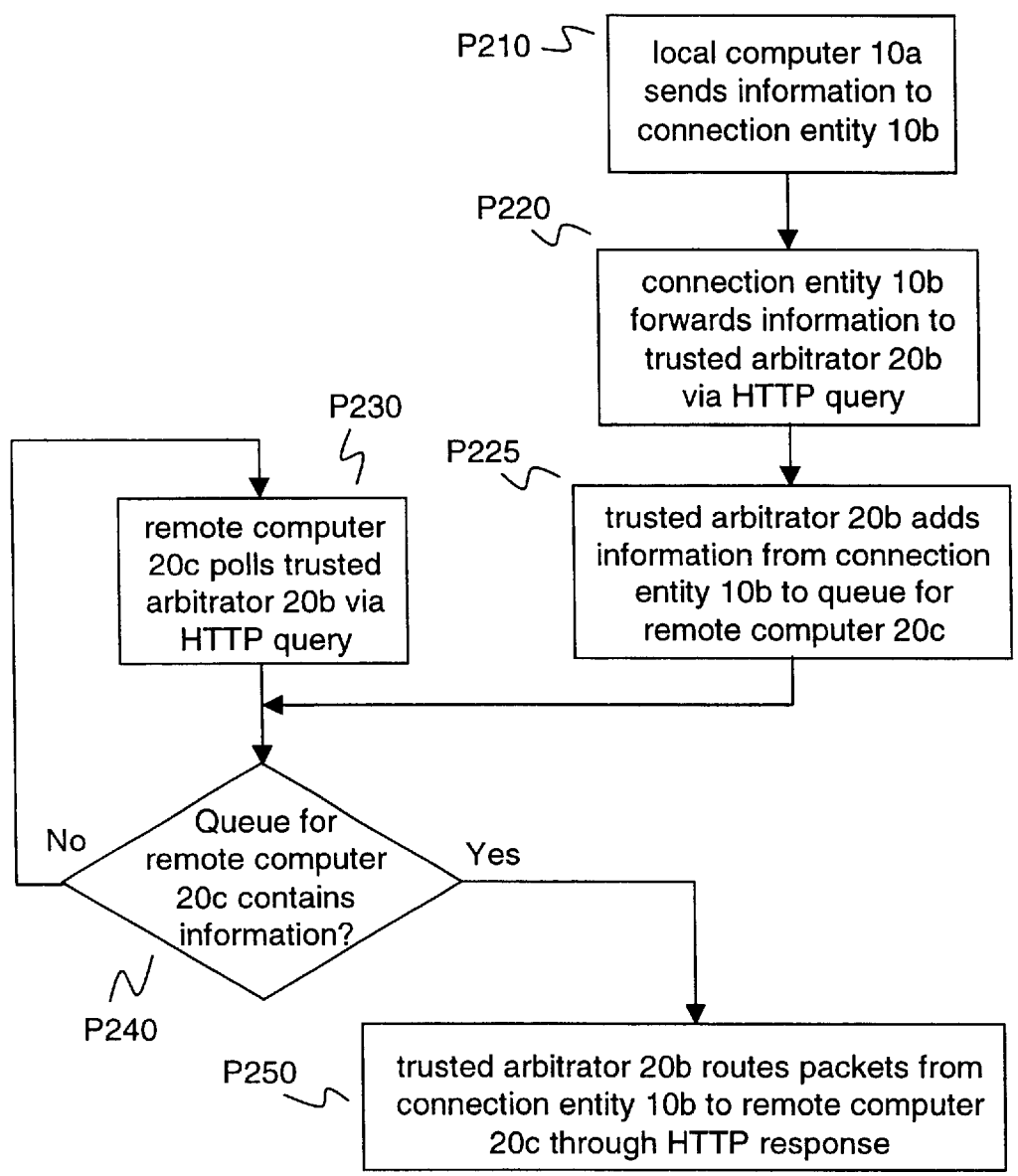
FIG. 6 shows a flow chart for an extension of a method according to an embodiment of the invention.
Figure 7:
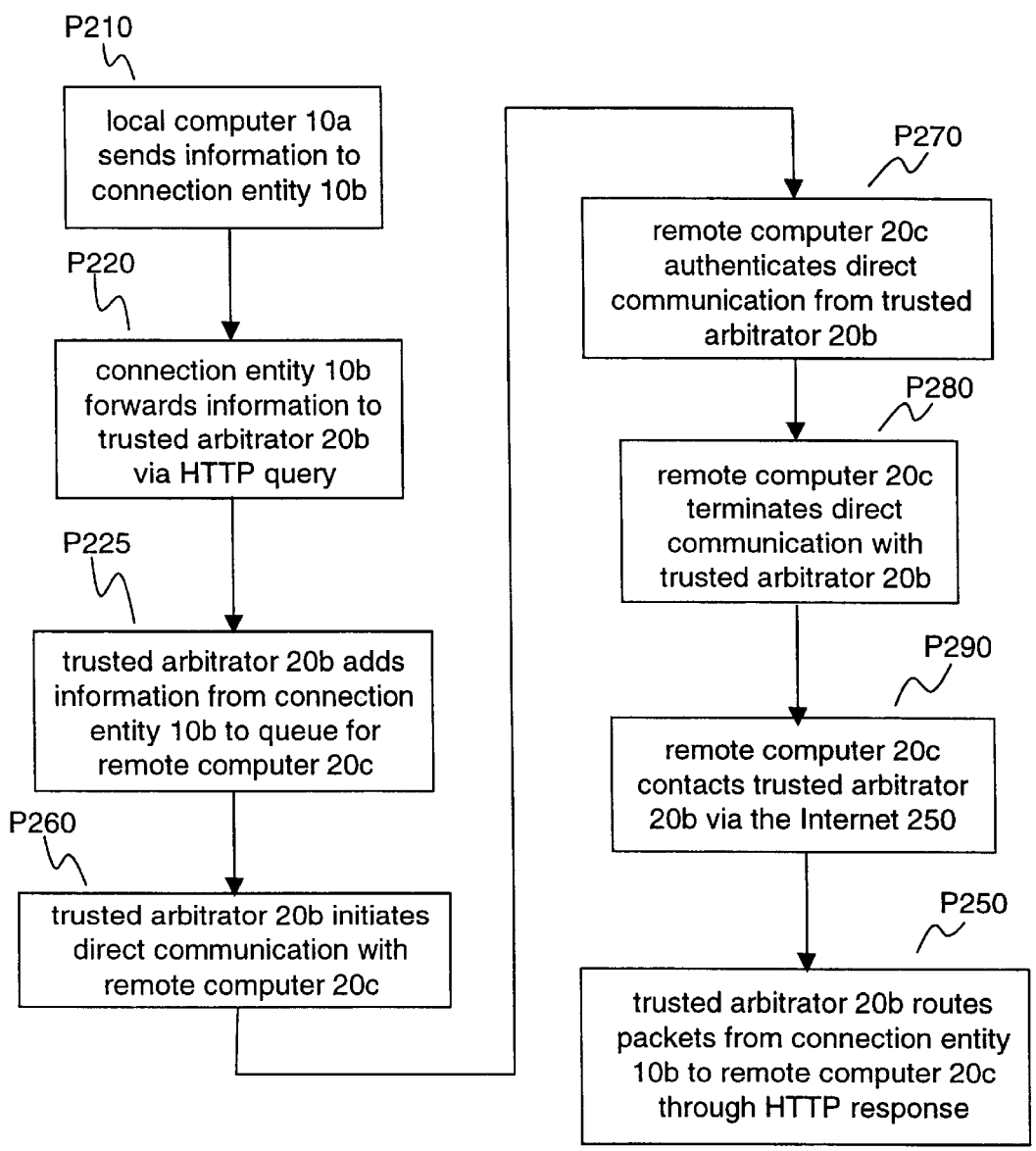
FIG. 7 shows a flow chart for an alternate extension of a method according to an embodiment of the invention.

As shown in FIGS. 6 and 7, any response to the incoming information that is subsequently generated by the target device (in this case, local computer 10a) may be forwarded back to remote computer 20c in an analogous fashion. In block P210, local computer 10a sends the response information to connection entity 10b. In block P220, connection entity 10b forwards this information to trusted arbitrator 20b via, e.g., a HTTP query. Trusted arbitrator 20b extracts the information destined for remote computer 20c and stores it in a secure area within its website. Trusted arbitrator 20b may also acknowledge receipt of the query in a HTTP response to connection entity 10b.

If remote computer 20c has a continuous connection to the external network (here, the Internet 250), then the method may proceed as shown in FIG. 6. After sending its request as described above, remote computer 20c polls trusted arbitrator 20b periodically in order to determine whether a response is available. In block P230 of the implementation shown in FIG. 6, for example, polling is performed via HTTP queries. If a response has been received from local computer 10a through connection entity 10b (block P240), then the information is forwarded to remote computer 20c. In this example (block P250), the information is sent in a HTTP response to the polling query. Alternatively, remote computer 20c may open a HTTP pipe to trusted arbitrator 20b only after trusted arbitrator 20b has indicated that a response to the request of remote computer 20c is available.

On the other hand, it is also possible to practice the invention in a case where remote computer 20c (like LAN 230) has a non-continuous connection to the external network, as shown in FIG. 7. After sending its request as described above, remote computer 20c is contacted by the trusted arbitrator 20b when a response is available. In block P260 of the implementation shown in FIG. 7, for example, trusted arbitrator 20b initiates a direct communication with remote computer 20c. This direct communication may include making a telephone call to a modem that communicates with remote computer 20c. After authenticating the communication received from trusted arbitrator 20b (block P270), remote computer 20c terminates this communication (block P280) and contacts trusted arbitrator 20b via the Internet (block P290). In this example, the remote computer 20c contacts trusted arbitrator 20b by sending a HTTP query. Trusted arbitrator 20b then routes the packets received from connection entity 10b to remote computer 20c (block P250). In this example, the information is sent in a HTTP response to the query initiated by the remote computer 20c.

A system and method according to an embodiment of the invention can support continued communications between an entity within the LAN and an entity outside it. In certain implementations, however, only limited communication abilities may be necessary. For example, the extent of a communication between the remote entity and the local entity may be limited to a single query and response. In such a case, a method according to a further embodiment of the invention may be used. In this method, any requests ready for forwarding are transferred by trusted arbitrator 20b to connection entity 10b over communications link 25c before it is terminated. The responses to these requests are then transmitted to trusted arbitrator 20b over communications link 25b via HTTP queries; e-mail transmissions using, e.g., Simple Mail Transfer Protocol (SMTP); or any other suitable technique. Alternatively, trusted arbitrator 20b may also transmit appropriate addressing information for the requesting remote entities over communications link 25c before it is terminated, so that the responses to these requests may be forwarded directly to those entities via communications link 25b (e.g. by HTTP or e-mail) rather than indirectly through trusted arbitrator 20b.

As described above, a method or apparatus according to an embodiment of the invention allows a secure connection to be established with an entity outside a LAN over a non-continuous connection, without changing the infrastructure of the LAN and while reducing monitoring costs. In one implementation, this connection is supported by communication through a trusted third-party website, thereby minimizing the risk of damage to the LAN due to breaches by unauthorized entities.

Figure 8:
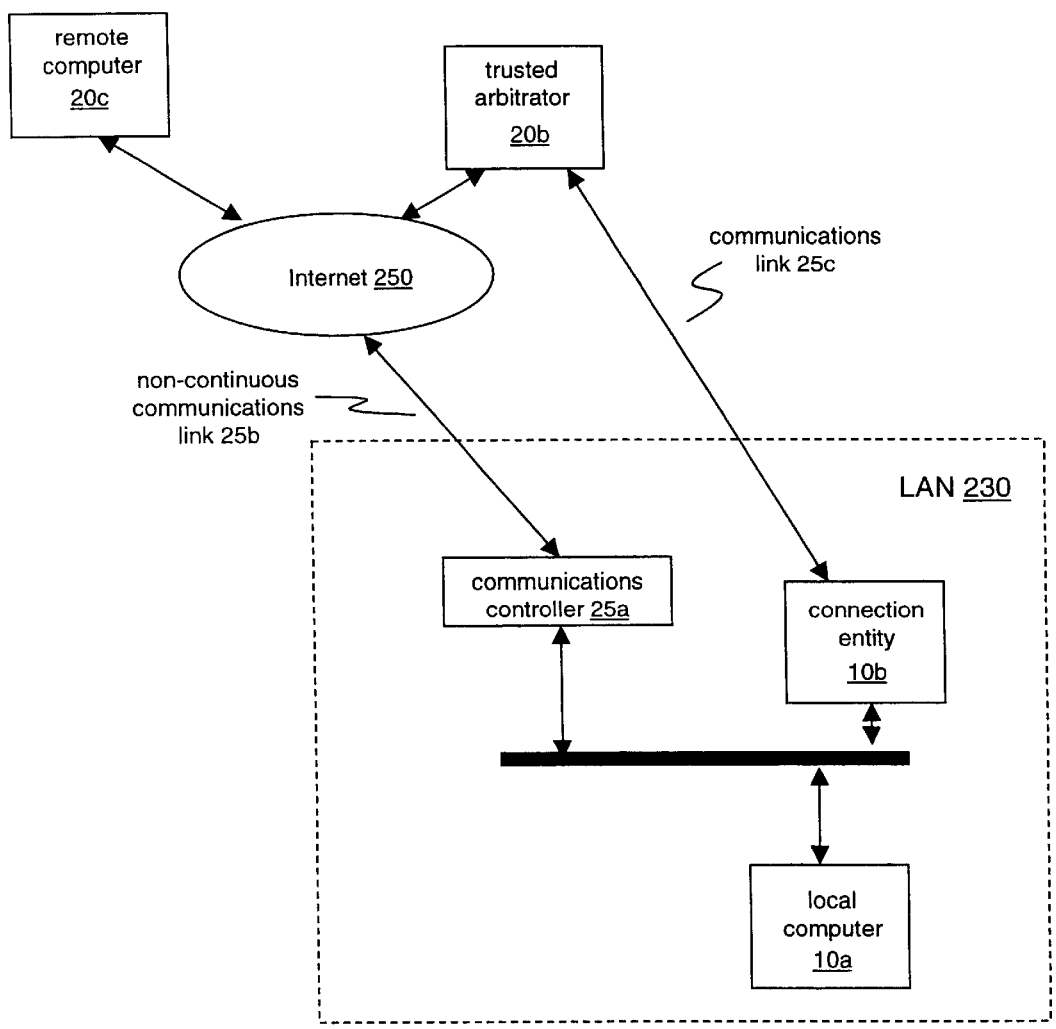
FIG. 8 shows a block diagram of a system according to an embodiment of the invention.

As for the methods described or suggested herein, many of the tasks within such methods may be performed in parallel or in different serial orders than as presented (for example, task P130 in FIG. 4 may be performed before or in parallel with task P120, and task P150 need not occur after task P140). Additionally, because the non-continuous nature of communications link 25b offers a certain degree of security, it may be acceptable in some applications to practice the invention with a system that lacks an ACM. In this case, it may only be necessary to ensure that a capability for routing traffic properly between communications link 25b and the entities within LAN 230 is provided for. For example, such capability may be provided for within a gateway server that does not perform the scrutinizing functions of an ACM. Alternatively, such capability may be provided for within communications controller 25a, as in the system shown in FIG. 8.

Figure 9:
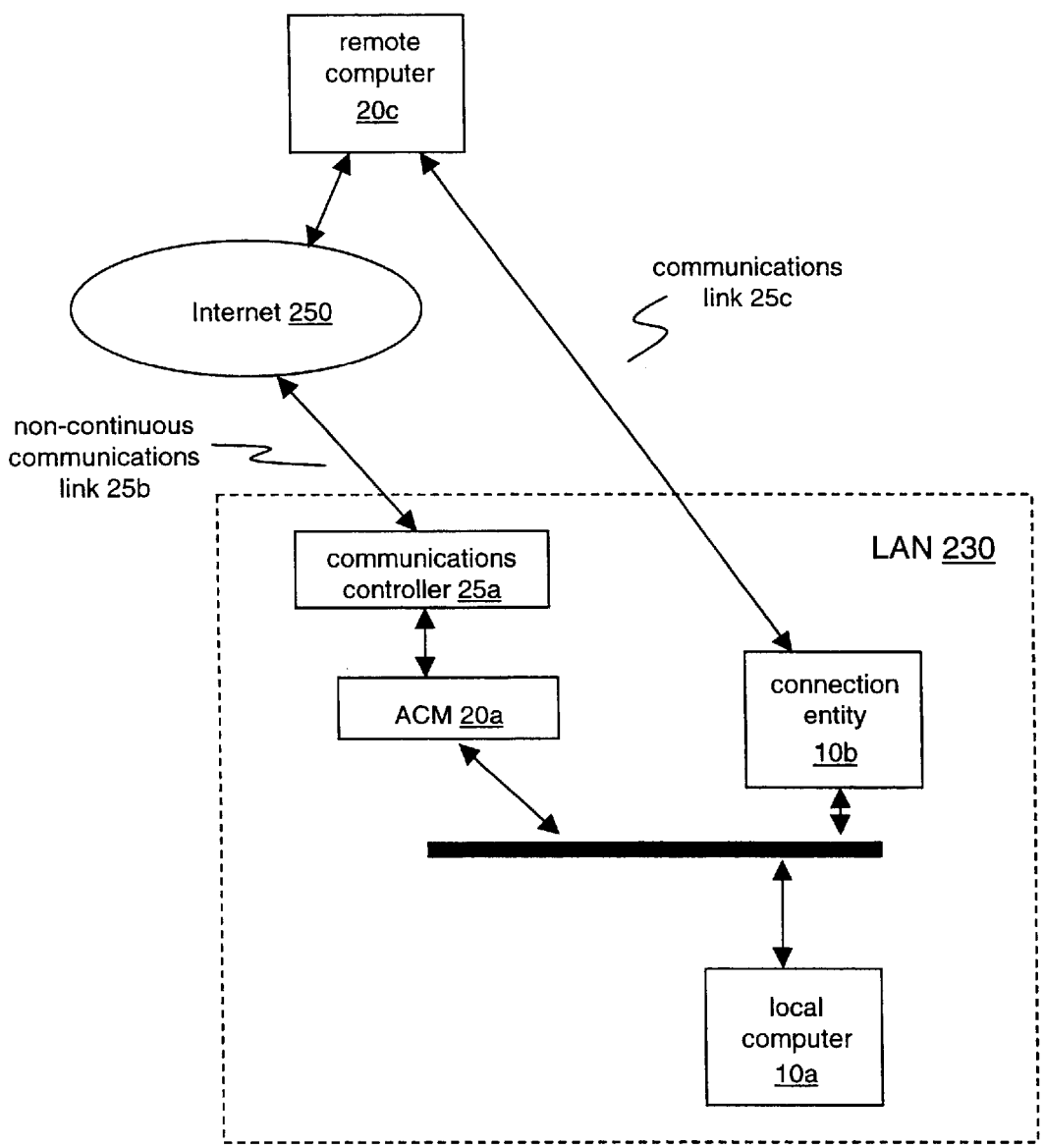
FIG. 9 shows a block diagram of a system according to an embodiment of the invention.

The invention may also be applied to allow the implementation of a VPN between, for example, trusted arbitrator 20b and LAN 230 over a non-continuous connection between LAN 230 and an external network. An alternative arrangement is shown in FIG. 9, wherein remote computer 20c is connected to the external network (here, the Internet 250), possibly through a non-continuous connection such as a dial-up telephone line. Remote computer 20c is also configured to communicate with LAN 230 over a VPN (as described, for example, in *Enabling Secure Virtual Private Networks Over the Internet*, white paper No. NP0894.01, Intel Corp., Santa Clara, Calif.). Communications link 25b is normally inactive, thus preventing remote computer 20c from establishing a VPN connection and accessing the LAN over the external network.

In order to activate the VPN, remote computer 20c contacts connection entity 10b over communications link 25c. This contact is similar to the one described above over this link between trusted arbitrator 20b and connection entity 10b, and data such as certification information, URLs, and requests directed toward local entities may (but need not) be transmitted during this contact in a like manner. If this contact and any associated certification procedures are successful, then the contact over communications link 25c is terminated and communications link 25b is opened (as discussed above with reference to block P145 of FIG. 4). Assuming that remote computer 20c has established its own connection to the external network by this time, the desired VPN connection is thus established.

In a further alternative arrangement, remote computer 20c communicates over the external network with a directory service (i.e. an entity that contains a directory of computers and/or networks). The directory service then activates the VPN and communicates with the LAN as described above.

Figure 10:
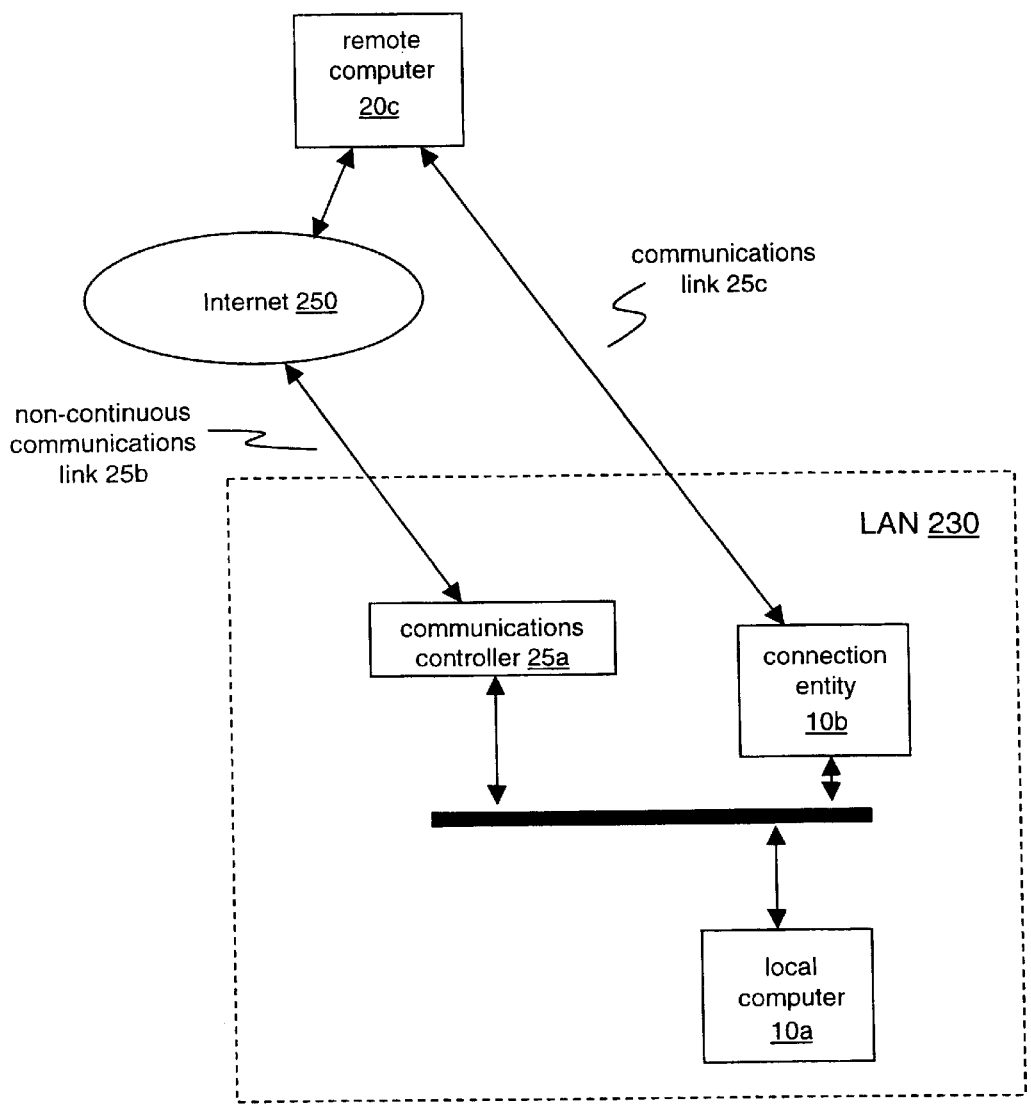
FIG. 10 shows a block diagram of a system according to an embodiment of the invention.

Note that the non-continuous nature of communications link 25b offers a certain measure of network security. In some applications, therefore, it may be acceptable to practice the invention without using an ACM. In this case, it may only be necessary to ensure that a capability for routing traffic properly between communications link 25b and the entities within LAN 230 is provided for. For example, such capability may be provided for within a gateway server that does not perform the scrutinizing functions of an ACM. Alternatively, such capability may be provided for within communications controller 25a, as in the system shown in FIG. 10.

The foregoing description is provided to enable any person skilled in the art to make or use the present invention. Various modifications to these embodiments are possible, and the generic principles presented herein may also be applied to other embodiments. For example, an embodiment of the invention may use a connection entity that is implemented as any combination of (1) hardware such as a computer or a device for processing network traffic such as a router, (2) firmware loaded into non-volatile storage, and/or (3) software loaded into random-access memory in the form of machine-readable code, such code being executable by an array of logic elements such as a microprocessor or other digital signal processing unit. The connection entity may also reside on a dedicated computer or may be simply one among several tasks executing on one computer. Additionally, it is possible in certain implementations for the connection entity and the communications controller to include parts of the same hardware unit(s) and/or application or interface program(s). Thus, the present invention is not intended to be limited to the embodiments shown above, but rather, is to be accorded the widest scope consistent with the principles and novel features disclosed in any fashion herein.

We claim:

1. A system, comprising:

a local area network, said local area network including (a) a local entity and (b) a connection entity coupled to the local entity;

a trusted arbitrator coupled to the local area network; and a remote entity coupled to the trusted arbitrator, wherein the remote entity transmits a first request to the trusted arbitrator, the first request being directed at least in part to the local entity, and the trusted arbitrator verifies the remote entity as a valid requester, and wherein after beginning to receive the first request, the trusted arbitrator transmits a first communication to the connection entity, the first communication being transmitted at least in part over a first communications link that is terminated after the first communication is completed, and wherein after beginning to receive the first communication, the connection entity transmits a second communication to the trusted arbitrator, the second communication being transmitted at least in part over a second communications link being a non-continuous communications link, and wherein the second communication comprises information directed to the remote entity relayed by the trusted arbitrator and is responsive to the first request.

2. The system according to claim 1, wherein the first communications link includes a dial-up telephone line.

3. The system according to claim 2, wherein the first communications link includes a modem.

4. The system according to claim 1, wherein the second communications link includes an external network.

5. The system according to claim 4, wherein the external network comprises the Internet.

6. The system according to claim 4, wherein the first request is transmitted at least in part over the external network.

7. The system according to claim 4, wherein the first request is transmitted at least in part over the Internet.

8. The system according to claim 7, wherein the first request includes a Uniform Resource Locator (URL).

9. The system according to claim 1, wherein the first request includes information relating to a secret shared by at least the trusted arbitrator and the connection entity.

10. The system according to claim 1, wherein before the second communication is transmitted, a communications controller establishes the second communications link.

11. The system according to claim 10, wherein the second communications link includes a dial-up telephone line.

12. The system according to claim 11, wherein the communications controller is a dial-up router.

13. The system according to claim 10, wherein the second communications link is established at least in part in response to a command transmitted by the connection entity.

14. The system according to claim 1, wherein the second communications link includes a server, and wherein a portion of the second communications link between the connection entity and the server includes a dial-up telephone line.

15. A method, comprising:

receiving a first request from a remote entity, the first request being directed at least in part to a local entity in a local area network;

verifying the remote entity as a valid requestor;

transmitting a first communication to a connection entity in the local area network, the first communication being transmitted at least in part over a first communications link;

terminating the first communications link after the first communication is completed;

receiving a second communication from the connection entity, the second communication being received at least in part over a second communications link being a non-continuous communications link, wherein the second communication comprises information directed to the remote entity and is responsive to the first request; and relaying the second communication to the remote entity.

16. The method according to claim 15, further comprising certifying the first request before transmitting the first communication.

17. The method according to claim 16, wherein certifying the first request includes verifying identification information sent by the remote entity.

18. The method according to claim 15, wherein the first request is received over the Internet.

19. The method according to claim 15, wherein the second communication is received over the Internet.

20. The method according to claim 15, wherein at least one among the first request and the second communication conform at least substantially to a Hypertext Transfer Protocol.

21. The method according to claim 15, wherein the first communications link includes a dial-up telephone line.

22. A data storage medium having machine-readable code stored thereon, the machine-readable code comprising instructions executable by an array of logic elements, the instructions defining a method comprising:

receiving a first request from a remote entity, the first request being directed at least in part to a local entity in a local area network;

verifying the remote entity as a valid requester;

transmitting a first communication to a connection entity in the local area network, the first communication being transmitted at least in part over a first communications link;

terminating the first communications link after the first communication is completed;

receiving a second communication from the connection entity, the second communication being received at least in part over a second communications link being a non-continuous communications link, wherein the second communication comprises information directed to the remote entity and is responsive to the first request; and relaying the second communication to the remote entity.

* * * * *